US012579250B2

(12) United States Patent　　　　(10) Patent No.:　US 12,579,250 B2
Medwed et al.　　　　　　　　　　　(45) Date of Patent:　　Mar. 17, 2026

(54) METHOD TO PROTECT A STACK FROM MANIPULATION IN A DATA PROCESSING SYSTEM

(71) Applicant: NXP B.V., Eindhoven (NL)

(72) Inventors: Marcel Medwed, Graz (AT); Erik Kraft, Graz (AT); Jan Hoogerbrugge, Helmond (NL); Tobias Schneider, Graz (AT)

(73) Assignee: NXP B.V., Eindhoven (NL)

( * ) Notice: Subject to any disclaimer, the term of this patent is extended or adjusted under 35 U.S.C. 154(b) by 176 days.

(21) Appl. No.: 18/366,727

(22) Filed: Aug. 8, 2023

(65) Prior Publication Data

US 2025/0053639 A1　　Feb. 13, 2025

(51) Int. Cl.
　　*G06F 21/52*　　　　(2013.01)
　　*G06F 21/60*　　　　(2013.01)
(52) U.S. Cl.
　　CPC ............ *G06F 21/52* (2013.01); *G06F 21/602* (2013.01)
(58) Field of Classification Search
　　CPC ............................... G06F 21/52; G06F 21/602
　　See application file for complete search history.

(56) References Cited

U.S. PATENT DOCUMENTS

| | | |
|---|---|---|
| 9,514,285 B2 | 12/2016 | Durham et al. |
| 10,579,806 B1 | 3/2020 | Pyo et al. |
| 10,740,452 B2 | 8/2020 | Hosie |
| 11,372,969 B1 | 6/2022 | Sundahl et al. |
| 11,620,391 B2 | 4/2023 | Lemay et al. |
| 2016/0094552 A1 | 3/2016 | Durham et al. |

FOREIGN PATENT DOCUMENTS

| | | |
|---|---|---|
| CN | 110348250 B | 12/2020 |

OTHER PUBLICATIONS

Ismail, Mohannad et al.; "Tightly Seal Your Sensitive Pointers with PACTight"; 31st Usenix Security Symposium (Usenix Security 22); Aug. 10-12, 2022, Boston, Massachusetts.
Li, Jingeng et al.; "Zipper Stack: Shadow Stacks Without Shadow"; Published in ESORICS 2020: 25th European Symposium on Research in Computer Security, ESORICS 2020, Guildford, UK, Sep. 14-18, 2020, Proceedings, Part I; https://doi.org/10.48550/arXiv.1902.00888.
Liljestrand, Hans et al.; "PACStack: an Authenticated Call Stack"; 30th Usenix Security Symposium, Aug. 11-13, 2021 Online; https://www.usenix.org/system/files/sec21-liljestrand.pdf.
Qiu, Pengfei et al.; "Control Flow Integrity Based on Lightweight Encryption Architecture"; IEEE Transactions on Computer-Aided Design of Integrated Circuits and Systems, vol. 37, Issue 7; Jul. 2018; DOI: 10.1109/TCAD.2017.2748000.

*Primary Examiner* — Ayoub Alata

(57)　　　　　　ABSTRACT

A method is provided to protect a stack of return addresses from manipulation. The return address indicates where to return in a computer program after a subroutine is called. In the method, an encryption key and an initial tweak value is selected. For a return address to be stored on the stack, a first chained address is generated by encrypting the return address with the encryption key and the initial tweak value. The first chained address is provided to the stack instead of the return address. For a subsequent return address that is subsequent to the return address, a second chained address is generated by encrypting the subsequent return address with the encryption key and the first chained address. The second chained address is provided to the stack instead of the subsequent return address. The method provides effective protection without requiring additional memory in a memory limited system.

20 Claims, 3 Drawing Sheets

|     | function: | Comments: |
|-----|-----------|-----------|
| 1   | addi·sp, ·sp, ·-8 | ; allocate space for registers and local vars on stack |
| 2   | sw·s0, ·0(sp) | ; store callee saved registers |
| 3 | sw·rca, ·4(sp) | ; push $ca_{i-1}$ on stack |
| 4 | te·rca, ·ra, ·rca\|tad | ; calculate $ca_i = E_K(ret_i, ca_{i-1}\|tad)$ and move in rca |
| ... | | ; ensure rca is not spilled or modified |
| N-5 | lw·s0, ·0(sp) | ; restore callee saved registers |
| N-4 | mv·ra, ·rca | ; move $ca_i$ into ra |
| N-3 | lw·rca, ·4(sp) | ; pop $ca_{i-1}$ into rca |
| N-2 | td·ra, ·ra, ·rca\|tad | ; calculate $ret_i = D_K(ca_i, ca_{i-1}\|tad)$ and move into ra |
| N-1 | addi·sp, ·sp, ·8 | ; restore original stack pointer value |
| N | jr·ra | ; return |

FIG. 2

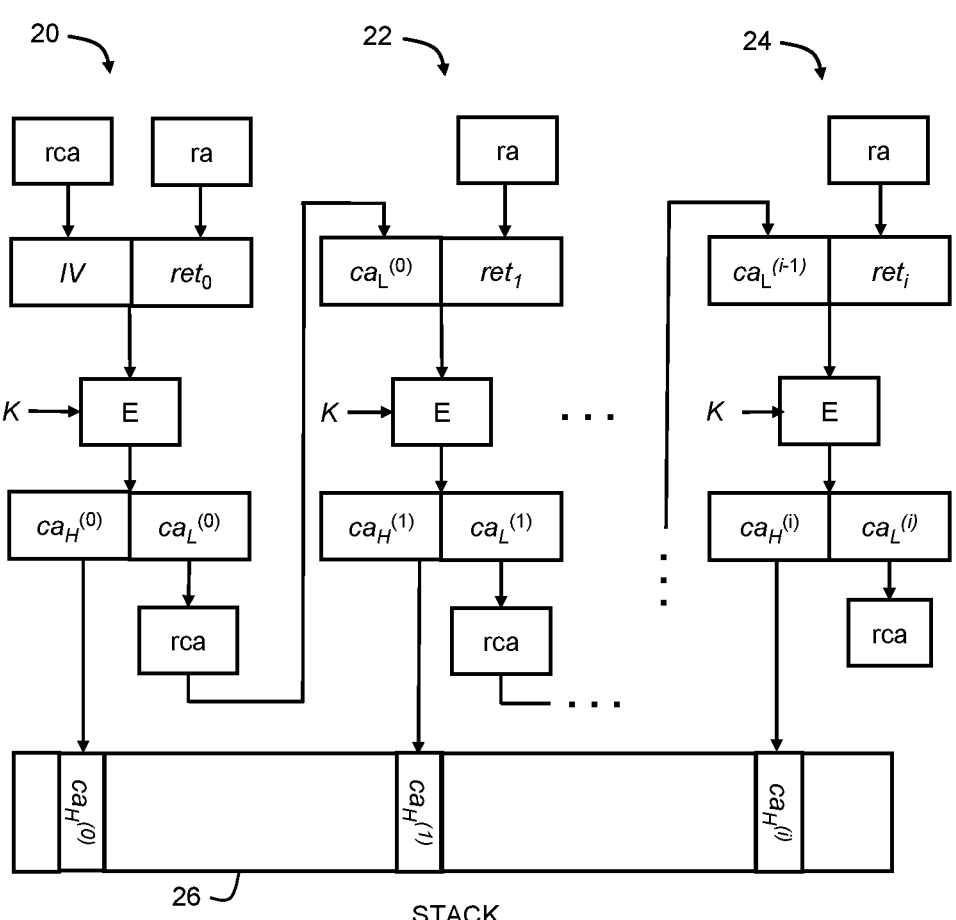

METHOD TO PROTECT A STACK FROM MANIPULATION IN A DATA PROCESSING SYSTEM

BACKGROUND

Field

This disclosure relates generally to data processing, and more particularly, to a method to protect a stack from manipulation in a data processing system.

Related Art

A stack, also referred to as a call stack, stores return addresses for returning to a main program after completing execution of a subroutine. There are many different types of attacks against cryptographic devices and integrated circuits. One type of attack is called return oriented programming (ROP). ROP attacks alter return addresses stored on the stack. Shadow stacks are a countermeasure to thwart control flow attacks which target backward edges, e.g., ROP attacks. Shadow stacks store the same return addresses as the call stack. Generally, in these types of attacks, the attacker cannot alter addresses on the shadow stack. When program execution returns to a main program after execution of the subroutine, the return address for the subroutine is loaded along with the same return address from the shadow stack. If the return addresses do not match, then an attack is assumed and an action can be taken such as stopping the program execution. Despite the effectiveness of shadow stacks, they have several disadvantages. For example, shadow stacks rely on logical isolation, or information hiding for isolation. It has been shown that pure logical isolation, as realized by a memory management or memory protection unit, is susceptible to fault injection attacks. Also, the use of shadow stacks may cause memory fragmentation. Memory fragmentation can result in multiple unused memory blocks.

Therefore, what is needed is a method to protect the stack that provides better fault protection than the shadow stack while also providing efficient memory usage.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 2 illustrates a portion of RISC-V pseudocode that implements the protection method of FIG. 1 according to an embodiment.

FIG. 3 illustrates a block diagram of a method to protect a stack from manipulation by an attacker according to another embodiment.

DETAILED DESCRIPTION

Figure 1:
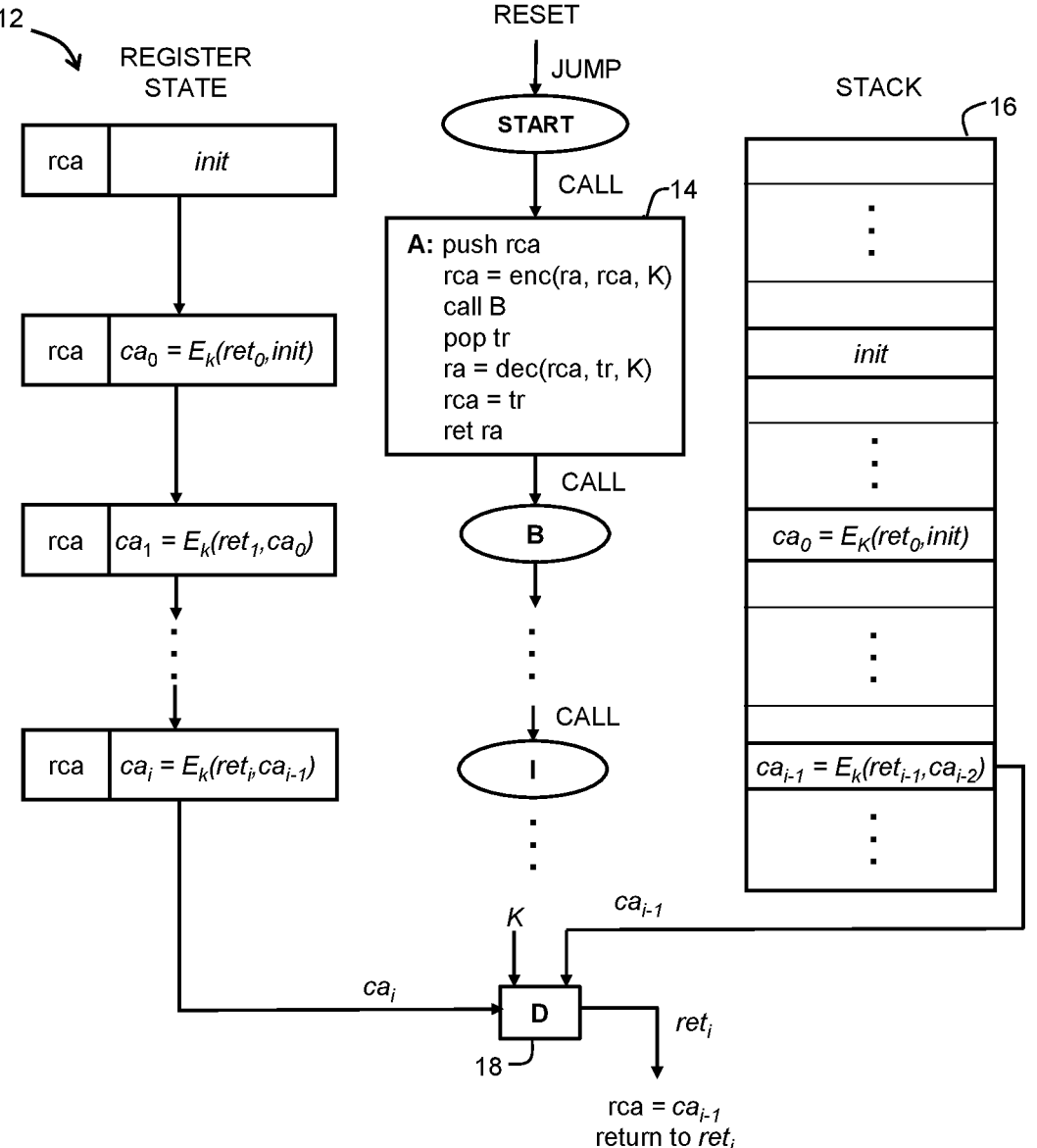
FIG. 1 illustrates a block diagram of a method to protect a stack from manipulation by an attacker in accordance with an embodiment.

Generally, there is provided, a method to protect a stack, sometimes called a call stack, of return addresses in the memory of a data processing system. When a subroutine is called in a computer program, the return addresses are used to indicate where to return to in the main program upon completion of the subroutine. Initially, in the method, an encryption key and an initial tweak value are selected. In a first embodiment of the method, a tweakable n-bit block cipher is provided to encrypt a return address with the encryption key and the initial tweak value. The encrypted return address is stored in the chaining register and the initial tweak value is loaded in the stack in place of the actual return address. For a subsequent return address, the tweak value of the block cipher becomes the encrypted return address in the chaining register. Each subsequent return address encryption uses the encrypted return address in the chaining register, that was the result of the previous return address encryption, as the tweak value. The tweak value of the tweakable n-bit block cipher may also include some additional context information. As such, the encrypted return addresses form a chain which cannot be manipulated by an attacker in a controlled way. Only the previous values of the chaining register are spilled onto the stack instead of the plaintext return addresses. A second embodiment uses a 2n-bit (non-tweakable) block cipher. During encryption, the first n-bits of the plaintext are the return address to protect, and the second n-bits of the plaintext consume the chaining register. The first n-bits of the resulting encryption are stored in the chaining register and the second n-bits are stored on the stack instead of the plaintext return addresses. A third embodiment is similar to the first embodiment, except that the chaining is done via a universal hash function instead of a tweakable block cipher. In the three embodiments, whenever a chaining output is stored on the stack, it undergoes memory encryption using a different tweak than was used for normal memory operations. The first and second embodiments can be placed inside a central processing unit (CPU), whereas the third embodiment can be split between the CPU and a memory encryption engine (MEE).

Using a tweakable encryption scheme provides the advantage of cryptographic protection without relying on logical isolation that may be overcome by fault injection attacks. Hence, the described embodiments, are independent of memory isolation while also having a relatively low memory overhead, thus making them suitable for use in relatively small processor architectures such as, for example, 32-bit RISC-V processor cores.

In accordance with an embodiment, there is provided a method to protect a stack of return addresses from manipulation in a data processing system, the method includes: selecting an encryption key; for a return address that is to be provided to the stack, generating a first chained address by encrypting the return address with the encryption key wherein the return address indicates where to return in a computer program after a subroutine is called; providing the first chained address to the stack instead of the return address; for a subsequent return address that is subsequent to the return address, generating a second chained address by encrypting the subsequent return address with the encryption key and the first chained address; and providing the second chained address to the stack instead of the subsequent return address. The encrypting of the return address may be performed using a tweakable block cipher. The method may further include a tweak value included with the encrypting of the return address. The method may further include adding an additional value to the tweak value, the additional value comprising one or more of, a stack address where a previous chained address is to be stored, and a unique function signature. A topmost chained address may be stored in an isolated memory location in the data processing system. The first chained address may have a first chain portion and a second chain portion, wherein the first chain portion may be provided to the stack, and wherein only the second chain portion may be used in the generation of the second chained address. The method may further include decrypting a combination of the first chain portion from the stack and the second chained portion to recover the subsequent return address. The method may further include: including a tweak value with the encrypting of the return address; applying a hash function to the return address and the initial tweak value to generate an output of the hash function; and generating the first chained address by encrypting the output of the hash function with the encryption key and the tweak value. The hash function may be an invertible universal hash function. The method may further include recovering the subsequent return address by applying a decryption function to the second chained address, the first chained address, and the encryption key.

In another embodiment, there is provided, a computer program stored on a non-transitory medium including executable instructions that when executed by a processor protect a stack of return addresses from manipulation in a data processing system, the instructions comprising: instructions for selecting an encryption key; for a return address that is to be provided to the stack, instructions for generating a first chained address by encrypting the return address with the encryption key, wherein the return address indicates where to return in a computer program after a subroutine is called; instructions for providing the first chained address to the stack instead of the return address; for a subsequent return address that is subsequent to the return address, instructions for generating a second chained address by encrypting the subsequent return address with the encryption key and the first chained address; and instructions for providing the second chained address to the stack instead of the subsequent return address. The encrypting of the return address may be performed using a tweakable block cipher. The computer program may further include a tweak value included with the encrypting of the return address. The computer program may further include instructions for adding an additional value to the tweak value, the additional value may include one or more of, a stack address where a previous chained address is to be stored, and a unique function signature. A topmost chained address may be stored in an isolated memory location in the data processing system. The first chained address may have a first chain portion and a second chain portion, wherein the first chain portion is provided to the stack, and wherein only the second chain portion is used in the generation of the second chained address. The computer program may further include instructions for decrypting a combination of the first chain portion from the stack and the second chained portion to recover the subsequent return address. The computer program may further include: including a tweak value with the encrypting of the return address; applying a hash function to the return address and the tweak value to generate an output of the hash function; and generating the first chained address by encrypting the output of the hash function with the encryption key and the tweak value. The hash function may be an invertible universal hash function. The computer program may further include recovering the subsequent return address by applying a decryption function to the second chained address, the first chained address, and the encryption key.

FIG. 1 illustrates a block diagram of a backward-edge CFI (control flow integrity) method to protect a stack from manipulation by an attacker in accordance with an embodiment. The method provides cryptographic chaining and encryption of return values (ret) to so-called chained addresses (ca). The encryption has the form $E_K(P, T)$ and is a tweakable block cipher with key K, plaintext P and tweak T. The chained address ca is calculated as, $$ca_i = \begin{cases} E_K(ret_0, init), & i = 0 \\ E_K(ret_i, ca_{i-1}), & i > 0 \end{cases}$$

where init is an initial tweak value and ret is a plaintext return address. The initial tweak value init can be any integer value. In one embodiment, the initial tweak value is a uniform random integer value. The initial tweak value init is used because there is no predecessor for the computation of the first-called chained address ca value, or top-most value for the chaining and encryption of the return address. For all other chained address values $ca_i$, every return address ret; is encrypted and cryptographically bound to the previous return addresses by using the corresponding previous chained address $ca_{i-1}$ as the tweak for the computation of the current chained address $ca_i$. This is shown in FIG. 1, where a register state of chain register rca is shown for each succeeding chain address calculation. The chain address $ca_i$ is then stored on the call stack instead of the return address $ret_{i+1}$. The chained addresses do not replace the return addresses on the stack one-to-one but are stored in chain register rca before being moved to the stack. Thus, chained address $ca_0$ replaces return address $ret_1$, chained address $ca_1$ replaces return address $ret_2$ and so on, but return address $ret_0$ is replaced by initial tweak value init. Hence, any change of a return address in a call path will lead to different values for its associated chained address and all following chained addresses, making the chained address values ca of diverging call paths statistically unique. The security properties are provided by the chaining connected with the requirement that the topmost chained address is stored in register rca, which is isolated and inaccessible to an attacker. The older chained addresses (from previously called functions in the call path) are stored on call stack 16 and may be overwritten by an attacker.

As shown in FIG. 1, when a subroutine is called, a prologue portion of pseudocode "A" 14 provides the chaining and encryption. Later decryption of the return address is in an epilogue portion of the subroutine. In register states 12, register rca is initialized with the initial tweak value init, which is provided to stack 16 in plaintext in place of the return address. The first chaining and encryption is performed for return address $ret_0$ and chaining address $ca_0=E_K$ ($ret_0$,init) is loaded into register rca. The chaining address $ca_0$ is provided to the stack instead of the return address $ret_1$. When another subroutine is called, the prologue portion of pseudocode at "B" (not shown but similar to the pseudocode of "A") is executed to calculate another chaining address $ca_1=E_K(ret_1,ca_0)$ using the previous chaining address $ca_0$. For each subsequent return address ret; the same chaining address calculation is performed and $ca_i=E_K(ret_i, ca_{i-1})$ and is provided to the stack as shown.

To return from a non-leaf function i, that is, a function that calls other functions, the genuine return address $ret_i$ is restored by decrypting 18 with epilogue portion of pseudocode "A" and encryption key K. The resulting plaintext $ret_i$ is moved to a return address register ra (not shown) as provided in pseudocode 14 in FIG. 1 where, $$ra = ret_i = D_K(ca_i, ca_{i-1}).$$

An attacker can modify the previous chained address $ca_{i-1}$ as it is stored on call stack 16, but as the key K is secret, it is infeasible to try to compute a tweak value that leads to a specific return address. In one embodiment, the key K is only used for chaining operations and not for any other operations. In another embodiment, the use of key K may be different. As the topmost chained address ca; cannot be changed, it is also infeasible to replay all or parts of the chained addresses. However, replaying collisions is still possible when a collision is found. The encryption of chained address ca depends on all previous chained address ca values. Even if an attacker replaces all chained address ca values on the stack with chained addresses from a different call path, chained address ca; will likely still decrypt to random garbage instead of the genuine return address as the previous chained address $ca_{i-1}$ does not match the expectation anymore. The topmost chained return address $ca_i$, stored in the isolated register rca, may be viewed as a root of trust. Returning a chained address to call stack 16 instead of the return address ensures that a function return jumps to a random code location if the previous chained address is tampered with. On the other hand, if decryption leads to the genuine return address, it is statistically safe to use the previous chained address as the new genuine topmost chained address. Hence, it is possible to traverse the call path (sequence of program addresses) backward one-by-one while mitigating possible attacks.

Note that the previous chained address $ca_{i-1}$ is needed for both the decryption and restoration of the previous topmost chained address. In an implementation, chained address $ca_{i-1}$ should be the same in both uses, i.e., it is loaded once and kept isolated in chaining register rca. Violating this implementation rule, i.e., not securing the chaining address value, would allow an attacker to change the value used for the restoration and keep a valid return address, making replay attacks feasible again.

For leaf functions, no adaptions are necessary as the return address $ret_i$ does not leave the return address ra register and cannot be modified by an attacker. However, it must be ensured that a compiler does not spill the value in the return address ra register to memory due to register pressure as this may allow the targeted modification of a return address by the attacker.

Note that adding more data to the tweak increases the security against attacks because then, in addition to the previous chained address, these other bits must match to receive a wanted value. Ideally, additional data tad for addition to the tweak includes data that may be implicitly available at the chain and unchain operations. For example, the stack address where the previous chained address will be stored or unique function signatures may be included in the additional data tad.

An objective of the method is to ensure that function returns traverse the taken genuine call path in the reverse direction by cryptographically protecting and binding each function's return address to all previous ones. When used with relatively small processor architectures, such as embedded RISC-V 32-bit architectures with limited memory, the use of unused bits in the return addresses to store, e.g., message authentication codes (MACs) cannot be exploited.

To prevent the introduction of memory overhead, the return addresses are encrypted with tweaks that depend on all previous return addresses. A simple encryption of return addresses would be sufficient to mitigate cases where an attacker tries to inject an arbitrary address because the key is secret. However, the dependency of the encryption results on all previous return addresses increases security because the chaining also mitigates replay attacks of observed ciphertexts.

The present scheme provides probabilistic attack mitigation instead of probabilistic attack detection because without the correct tweak, the decryption leads to a random value being used as the return address. There are multiple reasons why such a random return address might lead to a fault and, therefore, provide attack mitigation. For example, for smaller systems, such as an embedded 32-bit RISC-V processor having a limited amount of memory, large chunks of the 32-bit address space will be non-executable. A control transfer to these regions will lead to an instruction access fault exception. If unused executable memory regions exist, filling these regions with illegal instructions (zeroing the memory) can further narrow the valid jump locations. Suppose the random return lies within an executable memory region with valid instructions, but the instruction alignment is wrong. Then, an instruction address misaligned exception will be raised. Because a random return address leads to unexpected stack frame data and register values at the destination, later instructions in the program that access memory based on these values may raise an access fault.

FIG. 2 illustrates a portion of RISC-V pseudocode that implements the protection method of FIG. 1 according to an embodiment. The RISC-V pseudocode outlines the needed changes (bold) of a prologue and epilogue of non-leaf functions to integrate the chaining method with a stack for return addresses. The right column includes comments for each instruction. In FIG. 2, the prologue is the first four instructions and the epilogue is instructions N–5 to N. Note that additional data tad may not be part of the tweaked encryption and decryption instruction encodings in some embodiments. Instead, the tad information may be applied implicitly if possible, for example, as a stack pointer value. Note that the vertical bar denotes the combination of two values which may be realized by just concatenating them or applying other functions like hash functions.

FIG. 3 illustrates a block diagram of a method to protect a stack from manipulation by an attacker according to the second embodiment. Instead of using a tweak to realize the chaining, the chaining is performed before applying a 2n-bit (non-tweakable) block cipher and then the chained value is encrypted using a secret key. Note that n refers to the size of the instruction registers, e.g., 32-bits for a RISC-V processor. Such an arrangement has advantages when integrating it with an already existing non-tweakable block cipher implementation inside a CPU. For example, the second embodiment can be integrated into already existing non-tweakable block ciphers available in the hardware. For example, many processors include an advanced encryption standard (AES) hardware implementation. These already existing non-tweakable block cipher implementations can be reused without requiring a tweakable cipher which would consume additional area. Also, a tweakable block cipher may be built from a regular block cipher, but to be secure, the built tweakable block cipher would need two encryption operations and additional instructions which would increase the overhead. The second embodiment allows direct use of an existing non-tweakable block cipher.

In one example, a block cipher with a block size of at least 64-bits is used. Then, the chaining is performed by using parts of the previous ciphertext. FIG. 3 summarizes this chaining alternative. The chained address is partitioned into two portions. A first portion is the high portion of chained address ca labeled "$ca_H$", and a second portion that is the low portion of the chained address chained address ca labeled "$ca_L$". Then, the chaining and encryption is achieved by using $ca_L^{(i-1)}$ of the previous ciphertext in the plaintext for the next encryption alongside with the next return address ret; as shown in FIG. 3. Optionally, additional data $tad_i$ can be added to increase the security level by using an invertible function $f$ to combine $ca_L^{(i-1)}$ and $tad_i$ where, $$ca_H^{(i)} \mid ca_L^{(i)} = \begin{cases} E_K(init \mid ret_0) & i = 0 \\ E_K(f(ca_L^{(i-1)}, tad_i) \mid ret_i) & i > 0 \end{cases}$$

Note that the encryption $E_K$ and decryption $D_K$, with key K, are carried out with a different key or tweak than the other memory operations like load and store. Otherwise, an attacker could read out and inject data as usual.

The high part of the chained address $ca_H$ is then stored on the unprotected stack 26, while the low part $ca_L$ is stored in the isolated register rca, fulfilling the same function as the topmost chained address did in the embodiment of FIG. 1. Specifically, the low part $ca_L$ acts as an unmodifiable root of trust of a current call path. This prevents simple replay attacks as its value is never spilled nor can it be modified. Note that the root of trust for the chaining method of FIG. 3 only includes the lower part of the topmost chained address stored in register rca, but effectively its size is still greater or equal to the stored chained address in the method of FIG. 1 because of the increased block size.

Decrypting and unchaining are done by combining the current high portion of chained address $ca_H^{(i)}$ from the stack with the low portion of chained address $ca_L^{(i)}$ from the isolated register rca and decrypting the result. Then, the upper part of the plaintext can be used to restore the previous root of trust. Therefore, it is possible to traverse back longer chains:

$$f(ca_L^{(i-1)}, tad_i) \mid ret_i = D_K(ca_H^{(i)} \mid ca_L^{(i)})$$

$$ca_L^{(i-1)} = f^{-1}(f(ca_L^{(i-1)}, tad_i), tad_i).$$

The chaining calculation portions 20, 22, and 24 in FIG. 3 illustrate the sequence of chaining in the second embodiment. In chaining calculation portion 20, the chaining register rca is loaded with an initial value IV. Return address register ra is loaded with return address $ret_0$. An encryption with encryption block E and key K produces a chained address $ca_H^{(0)} \mid ca_L^{(0)}$ having a high portion $ca_H^{(0)}$ and a low portion $ca_L^{(0)}$. The high portion $ca_H^{(0)}$ is returned to stack 26 and the low portion $ca_L^{(0)}$ is loaded in chaining register rca, and then used for the next chaining calculation portion 22, where the same calculations occur with a next return address $ret_1$. Likewise, the chaining calculations repeat for subsequent return addresses as shown in chaining calculation portion 24. A common choice for the size of low portion $ca_L$ and high portion $ca_H$ is 32-bit as then the memory requirements stay the same as in the first embodiment of the method shown in FIG. 1.

In a third embodiment, an invertible universal hash function is used. Universal hashing refers to selecting a hash function at random from a family of hash functions. In the third embodiment, the return addresses are chained using an invertible universal hash function H and the output of this hash function $ha_i$ is then encrypted to arrive at the final chained addresses $ca_i$. Optionally, additional data $tad_i$ can be added to the hash function to increase the security level:

$$ha_i = \begin{cases} H(ret_0, init, tad_0), & i = 0 \\ H(ret_i, ha_{i-1}, tad_i) & i > 0 \end{cases}$$

$$ca_i = E_K(ha_i)$$

Such an arrangement has advantages when integrating it in hardware architectures with caches and memory encryption in a memory controller. Otherwise, such arrangements would have to store the tweak values associated with the return addresses together in the cache so that encryption can be performed after eviction from the cache. For example, the third embodiment can be integrated in an architecture with caches and a memory encryption engine in the memory controller. This may be difficult to do with the first and second embodiments. For example, in the first and second embodiments, at least some parts of the encryption result need to be stored in the isolated register rca. If you have an existing memory encryption engine in the memory controller this does not work as the result is written to memory directly which would violate the requirement that the topmost chained address is isolated in a register.

Also, the encryption in the first and second embodiments depends on the tweak value. If the encryption occurs in a memory encryption engine outside and separate from the processor, the tweak still needs to be supplied to the memory encryption engine. This would require the tweaks (32-bit) to be stored in addition to the plaintext data in the cache. Storing all this in the cache would require a larger cache which consume a larger area in an IC as well as requiring more power. The third embodiment only requires one additional bit per data word in the cache so it saves area and power if integrated with memory encryption engines and caches.

In addition, the third embodiment provides the advantage of being integrable with an existing memory encryption engine. That is, an already existing encryption hardware block in a system can be used, thus reducing area consumption. Furthermore, the encryption would not be part of the critical path within the processor, which may allow the use of higher frequencies without further processor changes. This is especially beneficial for smaller, simpler designs with short pipelines.

In the third embodiment, the topmost chained address is stored in the register rca in plaintext, while the previous encrypted chained addresses ca are on the stack. Recovery of the return address is achieved by computing the inverse hash of the hash function output, the decrypted previous chained address and the additional data, if used:

$$ret_i = H^{-1}(ha_i, D_K(ca_{i-1}), tad_i)$$

At function epilogues, as shown in FIG. 2, the return address is restored and chaining register rca is set to $ha_{i-1}$.

The difference between the third embodiment and first embodiment is that the chaining is done separately using plaintext values only.

As provided above for the first and second embodiments, encryption $E_K$ and decryption $D_K$ are carried out with a different key or tweak than the other memory operations like load and store. Otherwise, an attacker could read out and inject data into the stack. If caches are present and the memory encryption happens outside the CPU, in the third embodiment, the tweak to be stored in the cache can be reduced to a single bit per memory word.

Figure 4:
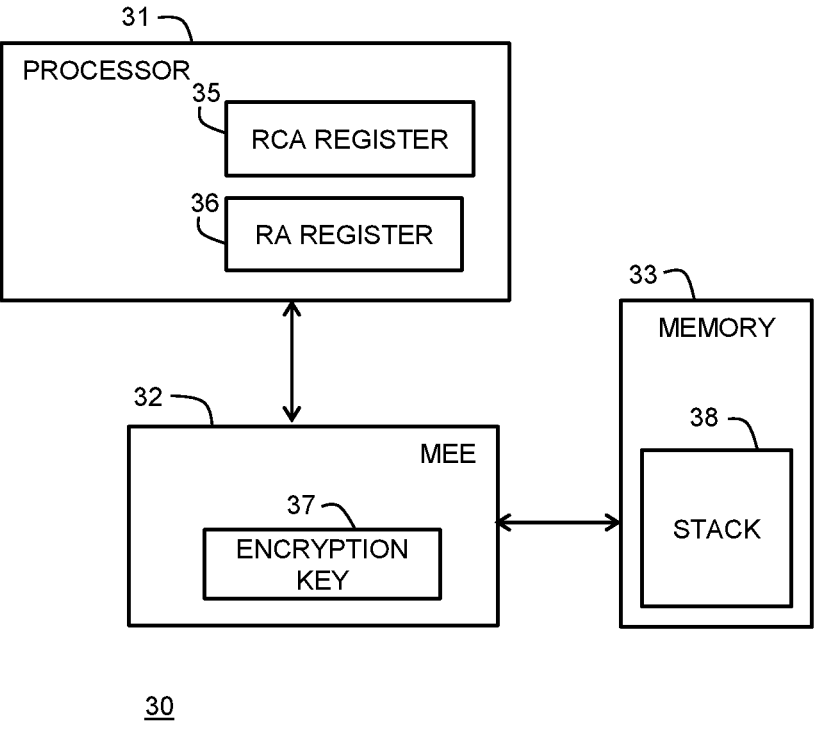
FIG. 4 illustrates a block diagram of a data processing system in accordance with an embodiment.

FIG. 4 illustrates a block diagram of a data processing system 30 in accordance with an embodiment. FIG. 4 is a simple high level view of a system to support chaining and encrypting of return addresses as provided herein above. FIG. 4 shows processor 31, memory encryption engine (MEE) 32, and memory 33 bidirectionally coupled together. Processor 31 may be, for example, a microprocessor, field programmable gate array (FPGA), application-specific integrated circuit (ASIC), or similar device. Processor 31 may be a RISC-V processor or any other type of processor architecture. Processor 31 executes instructions of a computer program stored in memory 33. Processor 31 includes chaining register 35 and return address register 36. Memory 33 is representative of all memory of data processing system 30 and may include one or more of an instruction memory, cache, data memory, and stack 38. Stack 38 stores returned encrypted chained addresses and may be the same or similar to stack 16 of FIG. 1 and stack 26 of FIG. 3. Memory encryption engine 31 includes encryption key 37 and encrypts and decrypts the chained addresses in stack 38.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method to protect a stack of return addresses from manipulation in a data processing system, the method comprising:
   selecting an encryption key;
   for a return address that is to be provided to the stack, generating a first chained address by encrypting the return address with the encryption key wherein the return address indicates where to return in a computer program after a subroutine is called;
   providing the first chained address to the stack instead of the return address;
   for a subsequent return address that is subsequent to the return address, generating a second chained address by encrypting the subsequent return address with the encryption key and the first chained address; and
   providing the second chained address to the stack instead of the subsequent return address.

2. The method of claim 1, wherein the encrypting of the return address is performed using a tweakable block cipher.

3. The method of claim 2, further comprising a tweak value included with the encrypting of the return address.

4. The method of claim 3, further comprising adding an additional value to the tweak value, the additional value comprising one or more of, a stack address where a previous chained address is to be stored, and a unique function signature.

5. The method of claim 1, wherein a topmost chained address is stored in an isolated memory location in the data processing system.

6. The method of claim 1, wherein the first chained address has a first chain portion and a second chain portion, wherein the first chain portion is provided to the stack, and wherein only the second chain portion is used in the generation of the second chained address.

7. The method of claim 6, further comprising decrypting a combination of the first chain portion from the stack and the second chained portion to recover the subsequent return address.

8. The method of claim 1, further comprising:
   including a tweak value with the encrypting of the return address;
   applying a hash function to the return address and the initial tweak value to generate an output of the hash function; and
   generating the first chained address by encrypting the output of the hash function with the encryption key and the tweak value.

9. The method of claim 8, wherein the hash function is an invertible universal hash function.

10. The method of claim 1, further comprising recovering the subsequent return address by applying a decryption function to the second chained address, the first chained address, and the encryption key.

11. A computer program stored on a non-transitory medium comprising executable instructions that when executed by a processor protect a stack of return addresses from manipulation in a data processing system, the instructions comprising:
   instructions for selecting an encryption key;
   for a return address that is to be provided to the stack, instructions for generating a first chained address by encrypting the return address with the encryption key, wherein the return address indicates where to return in a computer program after a subroutine is called;

instructions for providing the first chained address to the stack instead of the return address;

for a subsequent return address that is subsequent to the return address, instructions for generating a second chained address by encrypting the subsequent return address with the encryption key and the first chained address; and instructions for providing the second chained address to the stack instead of the subsequent return address.

12. The computer program of claim 11, wherein the encrypting of the return address is performed using a tweakable block cipher.

13. The computer program of claim 12, further comprising a tweak value included with the encrypting of the return address.

14. The computer program of claim 13, further comprising instructions for adding an additional value to the tweak value, the additional value comprising one or more of, a stack address where a previous chained address is to be stored, and a unique function signature.

15. The computer program of claim 11, wherein a topmost chained address is stored in an isolated memory location in the data processing system.

16. The computer program of claim 11, wherein the first chained address has a first chain portion and a second chain portion, wherein the first chain portion is provided to the stack, and wherein only the second chain portion is used in the generation of the second chained address.

17. The computer program of claim 16, further comprising instructions for decrypting a combination of the first chain portion from the stack and the second chained portion to recover the subsequent return address.

18. The computer program of claim 11, further comprising:

including a tweak value with the encrypting of the return address;

applying a hash function to the return address and the tweak value to generate an output of the hash function; and generating the first chained address by encrypting the output of the hash function with the encryption key and the tweak value.

19. The computer program of claim 18, wherein the hash function is an invertible universal hash function.

20. The computer program of claim 11, further comprising recovering the subsequent return address by applying a decryption function to the second chained address, the first chained address, and the encryption key.

* * * * *